United States Patent
Ronne et al.

(10) Patent No.: US 6,764,783 B2
(45) Date of Patent: Jul. 20, 2004

(54) ELECTROCHEMICAL FUEL CELL STACK WITH IMPROVED REACTANT MANIFOLDING AND SEALING

(75) Inventors: Joel A. Ronne, Vancouver (CA); Boguslaw M. Wozniczka, Coquitlam (CA); Clarence Y. Chow, Vancouver (CA); Henry H. Voss, West Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 10/438,093

(22) Filed: May 14, 2003

(65) Prior Publication Data

US 2003/0203246 A1 Oct. 30, 2003

Related U.S. Application Data

(63) Continuation of application No. 09/822,596, filed on Mar. 30, 2001, now Pat. No. 6,607,858, which is a continuation of application No. 09/471,564, filed on Dec. 23, 1999, now Pat. No. 6,232,008, which is a continuation-in-part of application No. 09/116,270, filed on Jul. 16, 1998, now Pat. No. 6,066,409.

(60) Provisional application No. 60/052,713, filed on Jul. 16, 1997.

(51) Int. Cl.[7] .............................................. H01M 8/00
(52) U.S. Cl. .......................................... 429/13; 429/17
(58) Field of Search ..................................... 429/13, 17

(56) References Cited

U.S. PATENT DOCUMENTS

| | | | |
|---|---|---|---|
| 5,238,754 A | 8/1993 | Yasuo et al. | 429/30 |
| 5,252,409 A | 10/1993 | Akagi | 429/32 |
| 5,252,410 A | 10/1993 | Wilkinson et al. | 429/33 |
| 5,419,980 A | 5/1995 | Okamoto et al. | 429/32 |
| 5,432,021 A | 7/1995 | Wilkinson et al. | 429/17 |
| 5,445,904 A | 8/1995 | Kaufman | 429/34 |
| 5,484,666 A | 1/1996 | Gibb et al. | 429/34 |
| 5,514,486 A | 5/1996 | Wilson | 429/30 |
| 5,514,487 A | 5/1996 | Washington et al. | 429/39 |
| 5,534,362 A | 7/1996 | Okamoto et al. | 429/32 |
| 5,686,199 A | 11/1997 | Cavalca et al. | 429/30 |
| 5,736,269 A | 4/1998 | Okamoto et al. | 429/32 |
| 5,750,281 A | 5/1998 | Washington et al. | 429/39 |
| 5,906,898 A | 5/1999 | Pondo | 429/34 |
| 6,066,409 A | 5/2000 | Ronne et al. | 429/39 |
| 6,124,053 A * | 9/2000 | Bernard et al. | 429/34 |
| 6,232,008 B1 | 5/2001 | Wozniczka et al. | 429/39 |
| 6,291,089 B1 * | 9/2001 | Piascik et al. | 429/17 |
| 6,602,626 B1 * | 8/2003 | Allen | 429/20 |

FOREIGN PATENT DOCUMENTS

| | | |
|---|---|---|
| JP | 05-109415 | 4/1993 |
| WO | WO 97/27639 | 7/1997 |

* cited by examiner

*Primary Examiner*—Bruce F. Bell
(74) *Attorney, Agent, or Firm*—McAndrews, Held & Malloy, Ltd.

(57) ABSTRACT

An electrochemical fuel cell stack with improved reactant man folding and sealing includes a pair of separator plates interposed between adjacent membrane electrode assemblies. Passageways fluidly interconnecting the anodes to a fuel manifold and interconnecting the cathodes to an oxidant manifold are formed between adjoining non-active surfaces of the pairs of separator plates. The passageways extend through one or more ports penetrating the thickness of one of the plates thereby fluidly connecting the manifold to the opposite active surface of that plate, and the contacted electrode. The non-active surfaces of adjoining separator plates in a fuel cell stack cooperate to provide passageways for directing both reactants from respective stack fuel and oxidant supply manifolds to the appropriate electrodes. The fuel and oxidant reactant streams passageways are fluidly isolated from each other, although they both traverse adjoining non-active surfaces of the same pair of plates.

11 Claims, 4 Drawing Sheets

ELECTROCHEMICAL FUEL CELL STACK WITH IMPROVED REACTANT MANIFOLDING AND SEALING

CROSS-REFERENCE TO RELATED APPLICATION(S)

This application is a continuation of U.S. patent application Ser. No. 09/822,596 filed Mar. 30, 2001 (now U.S. Pat. No. 6,607,858), which is a continuation of U.S. patent application Ser. No. 09/471,564 filed Dec. 23, 1999 (now U.S. Pat. No. 6,232,008), which is a continuation-in-part of U.S. patent application Ser. No. 09/116,270 filed Jul. 16, 1998 (now U.S. Pat. No. 6,066,409). The '270 application in turn relates to and claims priority benefits from U.S. Provisional Patent Application Serial No. 60/052,713 filed Jul. 16, 1997. The '596 application, the '008 and '409 patents, and the '713 provisional application, are incorporated herein by reference in their entireties.

FIELD OF THE INVENTION

The present invention relates to electrochemical fuel cell plates. In particular, the invention provides an electrochemical solid polymer fuel cell plate with improved reactant man folding and sealing in a fuel cell stack.

BACKGROUND OF THE INVENTION

Electrochemical fuel cells convert reactants, namely fuel and oxidant fluid streams, to generate electric power and reaction products. Electrochemical fuel cells employ an electrolyte disposed between two electrodes, namely a cathode and an anode. The electrodes generally each comprise a porous, electrically conductive sheet material and an electro catalyst disposed at the interface between the electrolyte and the electrode layers to induce the desired electrochemical reactions. The location of the electro catalyst generally defines the electrochemically active area.

Solid polymer fuel cells typically employ a membrane electrode assembly (MEA) consisting of an ion-exchange membrane as electrolyte disposed between two electrode layers. The membrane, in addition to being ion conductive (typically proton conductive) material, also acts as a barrier for isolating the reactant streams from each other.

The MEA is typically interposed between two separator plates which are substantially impermeable to the reactant fluid streams. The plates act as current collectors and provide support for the MEA. Surfaces of the separator plates which contact an electrode are referred to as active surfaces. The separator plates can have grooves or open-faced channels formed in one or both surfaces thereof, to direct the fuel and oxidant to the respective contacting electrode layers, namely, the anode on the fuel side and the cathode on the oxidant side. Such separator plates are known as flow field plates, with the channels, which can be continuous or discontinuous between the reactant inlet and outlet, being referred to as flow field channels. The flow field channels assist in the distribution of the reactant across the electrochemically active area of the contacted porous electrode. In some solid polymer fuel cells, flow field channels are not provided in the active surfaces of the separator plates, but the reactants are directed through passages in the porous electrode layer. Such passages may, for example, include channels or grooves formed in the porous electrode layer or can just be the interconnected pores or interstices of the porous material.

In a fuel cell stack, a plurality of fuel cells are connected together, typically in series, to increase the overall output power of the assembly. In such an arrangement, an active surface of the separator plate faces and contacts an electrode and a non-active surface of the plate can face a non-active surface of an adjoining plate. In some cases, the adjoining non-active separator plates can be bonded together to from a laminated plate. Alternatively, both surfaces of a separator plate can be active. For example, in series arrangements, one side of a plate can serve as an anode plate for one cell and the other side of the plate can serve as a cathode plate for the adjacent cell, with the separator plate functioning as a bipolar plate. Such a bipolar plate can have flow field channels formed on both active surfaces.

The fuel stream which is supplied to the anode separator plate typically comprises hydrogen. For example, the fuel stream can be a gas such as a substantially pure hydrogen or a reformat stream containing hydrogen. Alternatively, a liquid fuel stream such as aqueous methanol can be used. The oxidant stream, which is supplied to the cathode separator plate, typically comprises oxygen, such as substantially pure oxygen, or a dilute oxygen stream such as air.

A fuel cell stack typically includes inlet ports and supply manifolds for directing the fuel and the oxidant to the plurality of anodes and cathodes respectively. The stack often also includes an inlet port and manifold for directing a coolant fluid to interior passages within the stack to absorb heat generated by the exothermic reaction in the fuel cells. The stack also generally includes exhaust manifolds and outlet ports for expelling the unrelated fuel and oxidant gases, as well as an exhaust manifold and outlet port for the coolant stream exiting the stack. The stack manifolds, for example, can be internal manifolds, which extend through aligned openings formed in the separator layers and Mesa, or can comprise external or edge manifolds, attached to the edges of the separator layers.

Conventional fuel cell stacks are sealed to prevent leaks and inter-mixing of the fuel and oxidant streams. Fuel cell stacks typically employ fluid tight resilient seals, such as electrometric gaskets between the separator plates and membranes. Such seals typically circumscribe the manifolds and the electrochemically active area. Sealing is effected by applying a compressive force to the resilient gasket seals.

The passageways which fluidly connect each electrode to the appropriate stack supply and/or exhaust manifolds typically comprise one or more open-faced fluid channels formed in the active surface of the separator plate, extending from a reactant manifold to the area of the plate which corresponds to the electrochemically active area of the contacted electrode. In this way, for a flow field plate, fabrication is simplified by forming the fluid supply and exhaust channels on the same face of the plate as the flow field channels. However, such channels can present a problem for the resilient seal which is intended to fluidly isolate the other electrode (on the opposite side of the ion exchange membrane) from this manifold. Where a seal on the other side of the membrane crosses over open-faced channels extending from the manifold, a supporting surface is desirable or required to bolster the seal and to prevent the seal from leaking and/or sagging into the open-faced channel. One solution adopted in conventional separator plates is to insert a bridge member which spans the open-faced channels underneath the resilient seal. The bridge member preferably provides a sealing surface which is flush with the sealing surface of the separator plate so that a gasket-type seal on the other side of the membrane is substantially uniform compressed to provide a fluid tight seal. The bridge member also prevents the gasket-type seal from sagging into the open-faced channel and restricting the fluid flow between the manifold and the electrode. Instead of bridge members, it is also known to use metal tubes or other equivalent devices for providing a continuous sealing surface around the electrochemically active area of the electrodes (see, for example, U.S. Pat. No. 5,750,281), whereby passageways, which fluidly interconnect each electrode to the appropriate stack supply or exhaust manifolds, extend laterally within the thickness of a separator or flow field plate, substantially parallel to its major surfaces.

Conventional bridge members are affixed to the separator plates after the plates have been milled or molded to form the open-faced fluid channels. One problem with this solution is that separate bridge members add to the number of separate fuel cell components which are needed in a fuel cell stack. Further, the bridge members are typically bonded to the separator plates, so care should be exercised to ensure that the relatively small bridge members are accurately installed and that the bonding agent does not obscure the manifold port. It is also preferable to ensure that the bridge members are installed substantially flush with the sealing surface of the separator plate. Accordingly, the installation of conventional bridge members on separator plates adds significantly to the fabrication time and cost for manufacturing separator plates for fuel cell assemblies. Therefore, it is desirable to obviate the need for such bridge members, and to design an electrochemical fuel cell stack so that the fluid reactant streams are not directed between the separator plates and MEA seals.

SUMMARY OF THE INVENTION

In the present approach, passageways fluidly interconnecting an anode to a fuel manifold and interconnecting a cathode to an oxidant manifold in an electrochemical fuel cell stack are formed between the non-active surfaces of a pair of adjoining separator plates. The passageways then extend through one or more ports penetrating the thickness of one of the plates thereby fluidly connecting the manifold to the opposite active surface of that plate, and the contacted electrode. Thus, the non-active surfaces of adjoining separator plates in a fuel cell stack can cooperate to provide passageways for directing both reactants from respective fuel and oxidant manifolds to the appropriate electrodes. Of course, the fuel and oxidant reactant streams are fluidly isolated from each other, even though they are directed between adjoining non-active surfaces of the same pair of plates. Coolant passages can also be conveniently provided between non-active surfaces of adjoining separator plates.

An electrochemical fuel cell stack with improved reactant man folding and sealing comprises:

(a) a plurality of membrane electrode assemblies each comprising an anode, a cathode, and an ion-exchange membrane interposed between the anode and cathode;

(b) a pair of separator plates interposed between adjacent pairs of the plurality of membrane electrode assemblies, the pair of separator plates comprising:

an anode plate having an active surface contacting an anode, and an oppositely facing non-active surface, and a cathode plate having an active surface contacting a cathode, and an oppositely facing non-active surface which adjoins the non-active surface of the anode plate; and (c) a fuel supply manifold for directing a fuel stream to one, or preferably more of the anodes, and an oxidant supply manifold for directing an oxidant stream to one, or preferably more, of the cathodes, and fuel and oxidant stream passageways fluidly connecting the fuel and oxidant supply manifolds to an anode and a cathode, respectively, wherein at least one of the fuel and oxidant stream passageways traverses a portion of the adjoining non-active surfaces of a pair of the separator plates.

The electrochemical fuel cell stack can optionally further comprise an oxidant exhaust manifold for directing an oxidant stream from one, or preferably more, of the cathodes, and/or a fuel exhaust manifold for directing a fuel stream from one, or preferably more, of the anodes. In preferred embodiments, reactant stream passageways fluidly interconnecting the reactant exhaust manifold to the electrodes also traverse a portion of adjoining non-active surfaces of a pair of the separator plates.

In further embodiments, passages for a coolant can also be formed between cooperating non-active surfaces of adjoining anode and cathode plates, or one or more coolant channels can be formed in the active surface of at least one of the cathode and/or the anode separator plates. In an operating stack, a coolant can be actively directed through the cooling channels or passages by a pump or fan, or alternatively, the ambient environment can passively absorb the heat generated by the electrochemical reaction within the fuel cell stack.

The separator plates can be flow field plates wherein the active surfaces have reactant flow field channels formed therein, for distributing reactant streams from the supply manifolds across at least a portion of the contacted electrodes.

In the present approach, passageways for both the fuel and oxidant reactant streams extend between adjoining non-active surfaces of the same pair of plates, but the passageways are fluidly isolated from each other. To improve the sealing around the reactant stream passageways located between adjoining non-active surfaces of the separator plates, the fuel cell stack can further comprise one or more gasket seals interposed between the adjoining non-active surfaces. Alternatively, or in addition to employing gasket seals, adjoining separator plates can be adhesively bonded together. To improve the electrical conductivity between the adjoining plates, the adhesive is preferably electrically conductive. Other known methods of bonding and sealing the adjoining separator plates can be employed.

In the embodiments of an electrochemical fuel cell stack described above, the manifolds can be selected from various types of stack manifolds, for example internal manifolds comprising aligned openings formed in the stacked membrane electrode assemblies and separator plates, or external manifolds extending from an external edge face of the fuel cell stack.

As used herein, adjoining components are components which are in contact with one another, but are not necessarily bonded or adhered to one another. Thus the terms adjoin and contact are intended to be synonymous.

BRIEF DESCRIPTION OF THE DRAWINGS

In the above figures, similar references are used in different figures to refer to similar elements.

DETAILED DESCRIPTION OF PREFERRED EMBODIMENT(S)

Figure 1:
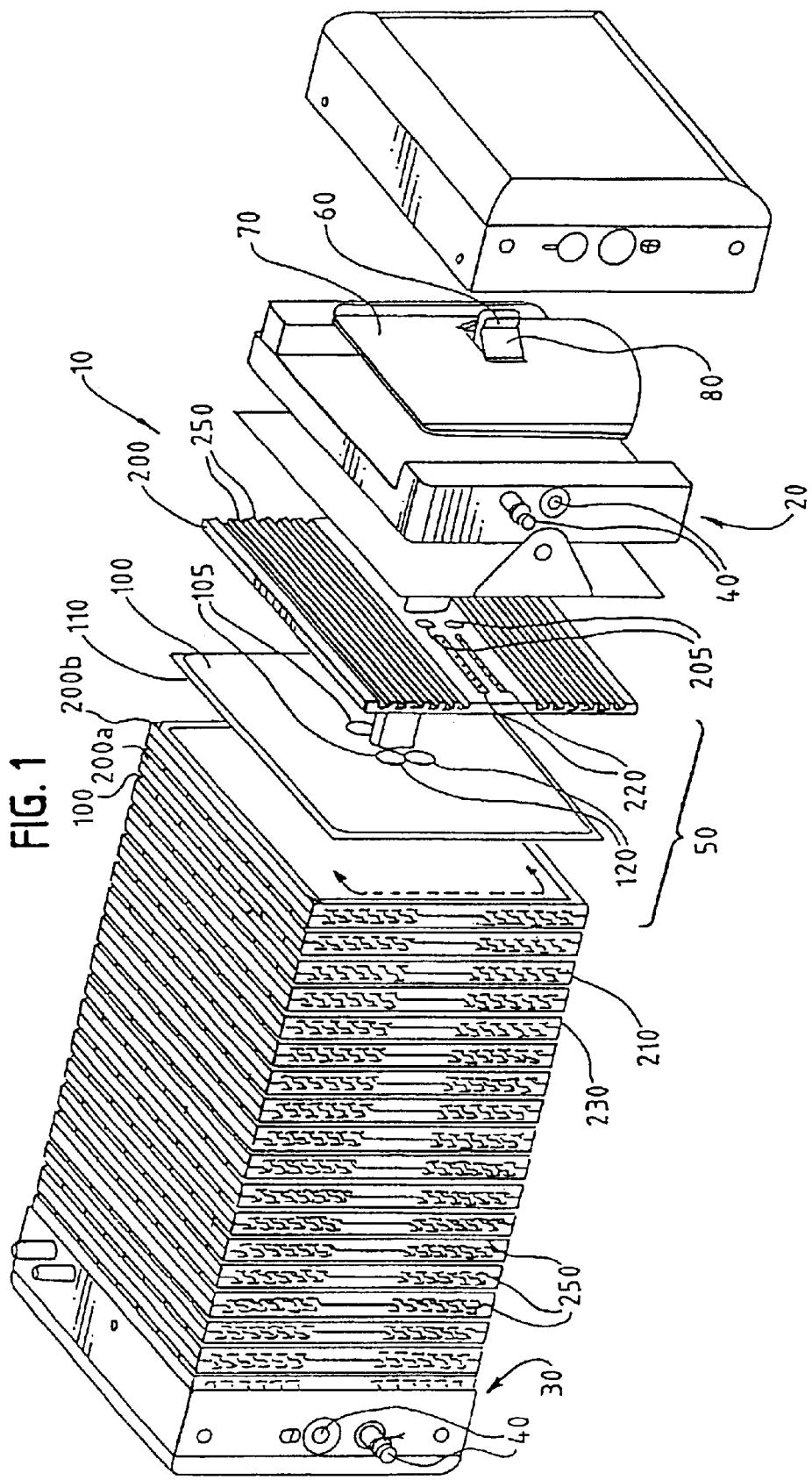
FIG. 1 is a partially exploded perspective view of an embodiment of an electrochemical solid polymer fuel cell stack with improved reactant man folding and sealing.

FIG. 1 illustrates a solid polymer electrochemical fuel cell stack 10, including a pair of end plate assemblies 20 and 30, and a plurality of stacked fuel cell assemblies 50, each comprising an MEA 100, and a pair of separator plates 200. Between each adjacent pair of Mesa 100 in the stack, there are two separator plates 200 which have adjoining surfaces. An adjoining pair of separator plates are shown as 200a and 200b. A tension member 60 extends between end plate assemblies 20 and 30 to retain and secure stack 10 in its assembled state. Spring 70 with clamping members 80 grip an end of tension member 60 to apply a compressive force to fuel cell assemblies 50 of stack 10.

Fluid reactant streams are supplied to and exhausted from internal manifolds and passages in stack 10 via inlet and outlet ports 40 in end plate assemblies 20 and 30. Aligned internal reactant manifold openings 105 and 205 in Mesa 100 and separator plates 200, respectively, form internal reactant manifolds extending through stack 10.

In the illustrated embodiment, perimeter seal 10 is provided around the outer edge of both sides of MEA 100. Manifold seals 120 circumscribe internal reactant manifold openings 105 on both sides of MEA 100. When stack 10 is secured in its assembled, compressed state, seals 110 and 120 cooperate with the adjacent pair of plates 200 to fluidly isolate fuel and oxidant reactant streams in internal reactant manifolds and passages, thereby isolating one reactant stream from the other and preventing the streams from leaking from stack 10.

As illustrated in FIG. 1, each MEA 100 is positioned between the active surfaces of two separator plates 200. Each separator plate 200 has flow field channels 210 on the active surface thereof (which contacts the MEA) for distributing fuel or oxidant fluid streams to the active area of the contacted electrode of the MEA 100. In the embodiment illustrated in FIG. 1, flow field channels 210 on the active surface of plates 200 are fluidly connected to internal reactant manifold openings 205 in plate 200 via supply/exhaust passageways comprising channels 220 (partially shown) located on the non-active surface of separator plate 200 and ports 230 extending through (i.e. penetrating the thickness) of plate 200. One end of port 230 is open to the active area of separator plate 200 and the other end of port 230 is open to reactant channel 220. With the illustrated manifold configuration, neither perimeter seals 110 nor manifold seals 120 bridge the open-faced channels formed on the adjoining active surface of plates 200, thus the seals on both sides of MEA 100 are completely supported by the separator plate material.

In the illustrated embodiment, separator plates 200 have a plurality of open-faced parallel channels 250 formed in the non-active surface thereof. Channels 250 on adjoining of plates 200 cooperate to form passages extending laterally between opposing edge faces of stack 10 (perpendicular to the stacking direction). A coolant stream, such as air, can be directed through these passages to remove heat generated by the exothermic electrochemical reactions which are induced inside the fuel cell stack.

Figure 2B:
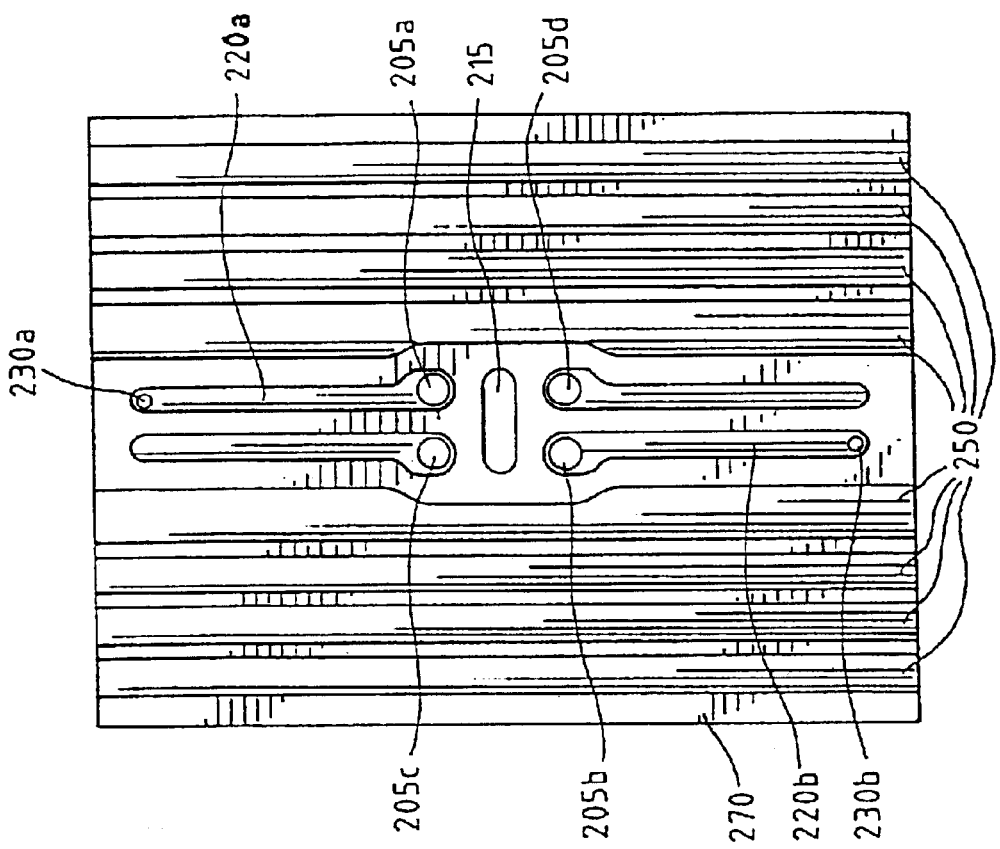
FIGS. 2A and 2B are plan views of the active and non-active surfaces, respectively, of a separator plate of the fuel cell stack of FIG. 1.
Figure 2A:
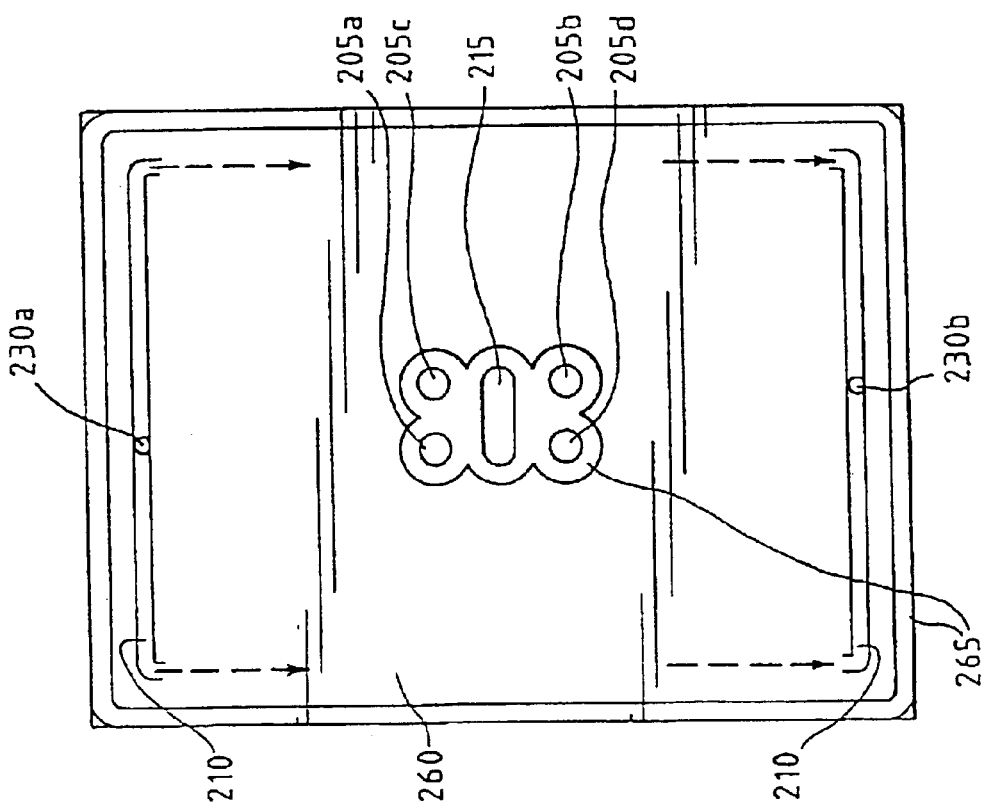

FIGS. 2A and 2B are plan views of the active and non-active surfaces, respectively, of a separator plate 200 of the fuel cell stack of FIG. 1; separator plate 200 has openings extending there through, namely reactant supply and exhaust manifold openings 205a through 205d, and tie rod opening 215. FIG. 2A depicts the active surface 260 of separator plate 200 which, in a fuel cell stack contacts an MEA. Flow field channels, only a portion of which are shown (for clarity) as 210, distribute a reactant stream, to the contacted electrode layer of the MEA. Flow field channels can comprise one or more continuous or discontinuous channels between the reactant inlet and outlet ports 230a and 230b. A reactant stream is supplied to and exhausted from flow field channels 210 from the reverse non-active surface 270 of plate 200 via ports 230a and 230b which penetrate the thickness of plate 200. FIG. 2B depicts the reverse, non-active surface 270 of separator plate 200. FIG. 2B shows how ports 230a and 230b are fluidly connected to reactant channels 220a and 220b respectively, which in turn are fluidly connected to supply and exhaust manifold openings 205a and 205b. Adjoining pairs of separator plates can be substantially identical. Thus, in a stack, supply and exhaust manifold openings 205c and 205d can be fluidly connected to the active surface of an adjoining separator plate via analogous channels 220c and 220d (not shown) and ports 230c and 230d (not shown) formed in that adjoining plate. Alternatively the non-active surface of the adjoining plate could be substantially planar, but it would cooperate with the channels 220 formed in the illustrated plate to form the reactant supply and exhaust channels (see FIG. 3B below).

FIG. 2A also illustrates how grooves 265 in the active surface 260 of plate 200 provide continuous sealing surfaces around flow field active area 260. In particular, grooves 265 provide a depressed surface for receiving seal 110 around the perimeter edge and around the manifold openings 205a through 205d.

FIG. 2B also depicts an embodiment in which multiple coolant channels 250 are also formed in the non-active surface 270 of plate 200. Thus, in the illustrated embodiment, channels for both reactants and for a coolant traverse a portion of the non-active surface of separator plate 200. Depicted coolant channels 250 are suitable for an open cooling system which uses air as the coolant. For example, cooling air can be blown through the channels by a fan or blower. For low power fuel cells such as portable units, it may be possible to operate a fuel cell stack without a fan by relying only on the transfer of heat from the surfaces of cooling channels 250 to the ambient air. A closed cooling system (not shown) typically employs stack coolant manifolds, which could be external or else similar to the internal reactant manifolds, fluidly connected to an array of coolant channels.

Figure 3A:
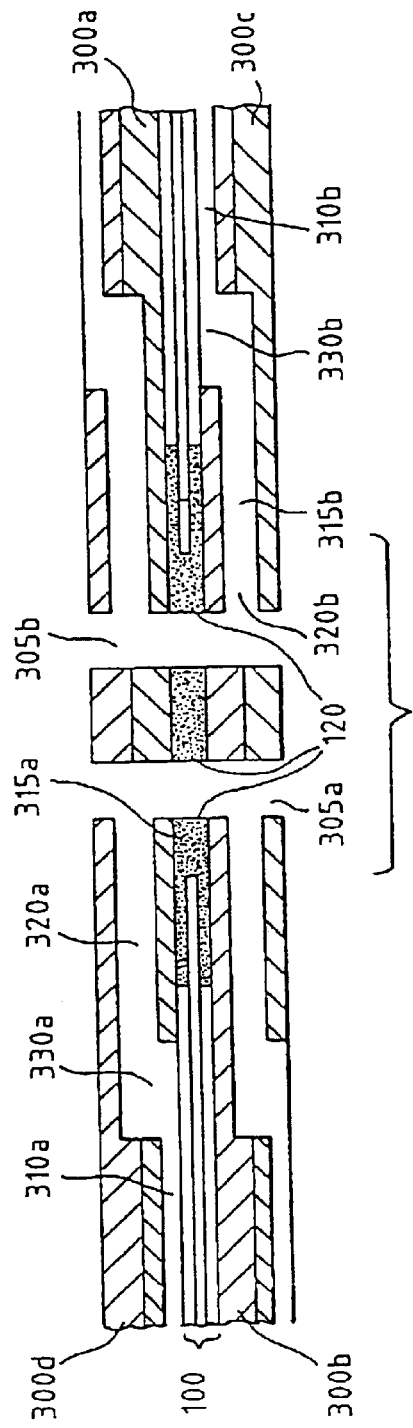
FIGS. 3A and 3B are partial sectional views of an MEA interposed between two pairs of separator plates illustrating a fluid connection between the electrodes and the manifolds via passageways formed between adjoining non-active surfaces on the pairs of separator plates.
Figure 3B:
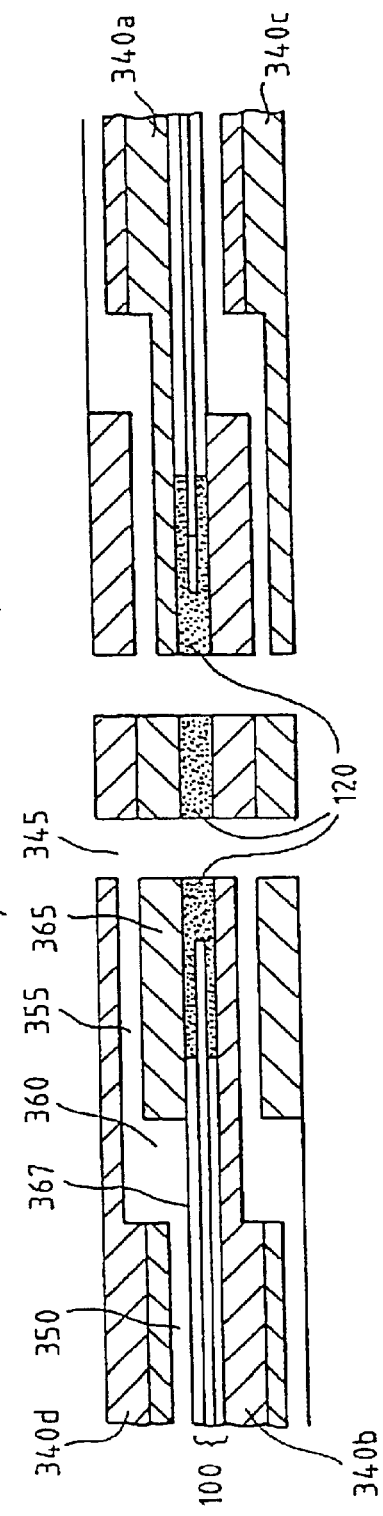

FIGS. 3A and 3B show partial cross-sectional views of embodiments of portions of a fuel cell stack which employ improved man folding, so that continuous sealing surfaces circumscribing the flow field area and internal fluid manifolds on the separator plates can be provided. Internal manifolds are provided by aligned openings in the separator plates 300 and MEA 100, as shown for example in FIG. 3A, by fuel manifold 305a and oxidant manifold 305b.

With reference to FIG. 3A, the fuel cell stack comprises anode separator plates 300a and 300c, and cathode separator plates 300b and 300d. An MEA 100 with seals 120 is interposed between the active surfaces of anode and cathode separator plates 300a and 300b. The anode of the MEA 100 contacts anode separator plate 300a and the cathode of MEA 100 contacts cathode separator plate 300b. FIG. 3A illustrates the fluid connection between flow field channels 310a and 310b, and respective manifolds 305a and 305b.

Resilient seals 120 isolate the MEA cathode from fuel manifold 305a and the MEA anode from oxidant manifold 305b, thereby preventing inter-mixing of the reactant fluids. Seals 120 are compressed between separator plates 300a and 300b. Portions 315a and 315b of separator plates 300a, 300b respectively provide substantially rigid support for seals 120. No separate bridging members are required because seals 120 do not span open-faced channels on the adjacent plate.

FIG. 3A illustrates an embodiment of in which open-faced reactant channels, provided on both of the non-active surfaces of adjoining separator plates 300a and 300d, cooperate to provide a fuel passageway 320a. Fuel passageway 320a extends from manifold 305a to the anode via a plate opening or port 330a which extends through the thickness of plate 300a to fuel flow field channel 310a. By providing open-faced channels in both of the adjoining non-active surfaces, a deeper fuel passageway 320a can be provided. An advantage of deeper fluid passageways is that deeper channels reduce energy losses associated with conveying the reactant fluids through reactant channels. Similarly, open-faced channels formed in the non-active surfaces of separator plates 300b and 300c cooperate to provide an oxidant passagew2 ay 320b, for fluidly connecting the oxidant flow field channel 310b and the contacted cathode to oxidant manifold 305b.

FIG. 3B is similar to FIG. 3A, but illustrates an embodiment in which open-faced reactant channels, provided the non-active surfaces of a separator plate cooperate with a substantially planar portion of the non-active surface of the adjoining plates to provide the passageways. For example, an open-faced channel 355 is formed in the non-active surface of separator plate 340d, which cooperates with a substantially planar portion of the non-active surface of plate 340a to provide a fuel passageway connecting fuel manifold 345 to fuel flow field channel 350 via port opening 360. Similar cooperation of the non-active surface plates 340b and 340c provides other such passageways. An advantage of this embodiment is that portions of the separator plates which support some of the MEA seals 120 (for example portion 365 of plate 240a in FIG. 3B) have substantially the same thickness as the separator plate 340a, thereby providing increased rigidity and improved resistance to deflection. Another feature of the embodiment illustrated in FIG. 3B is fluid impermeable material 367 which superposes the surface of MEA 100 opposite to manifold port opening 360. This can protect the MEA electrodes and membrane from damage which may be caused by the impinging reactant stream entering flow field channel 350 via port 360. The fluid impermeable material can be the same material which is employed for seal 120. Preferably the fluid impermeable layer is bonded to the surface of MEA 100 or is impregnated into the porous electrode. Fluid impermeable material 367 can extend from the region opposite manifold port opening 360 to seal 120. Thus the material for fluid impermeable layer 367 can be conveniently applied to MEA 100 at the same time as the sealant material is deposited for seal 120.

Figure 4:
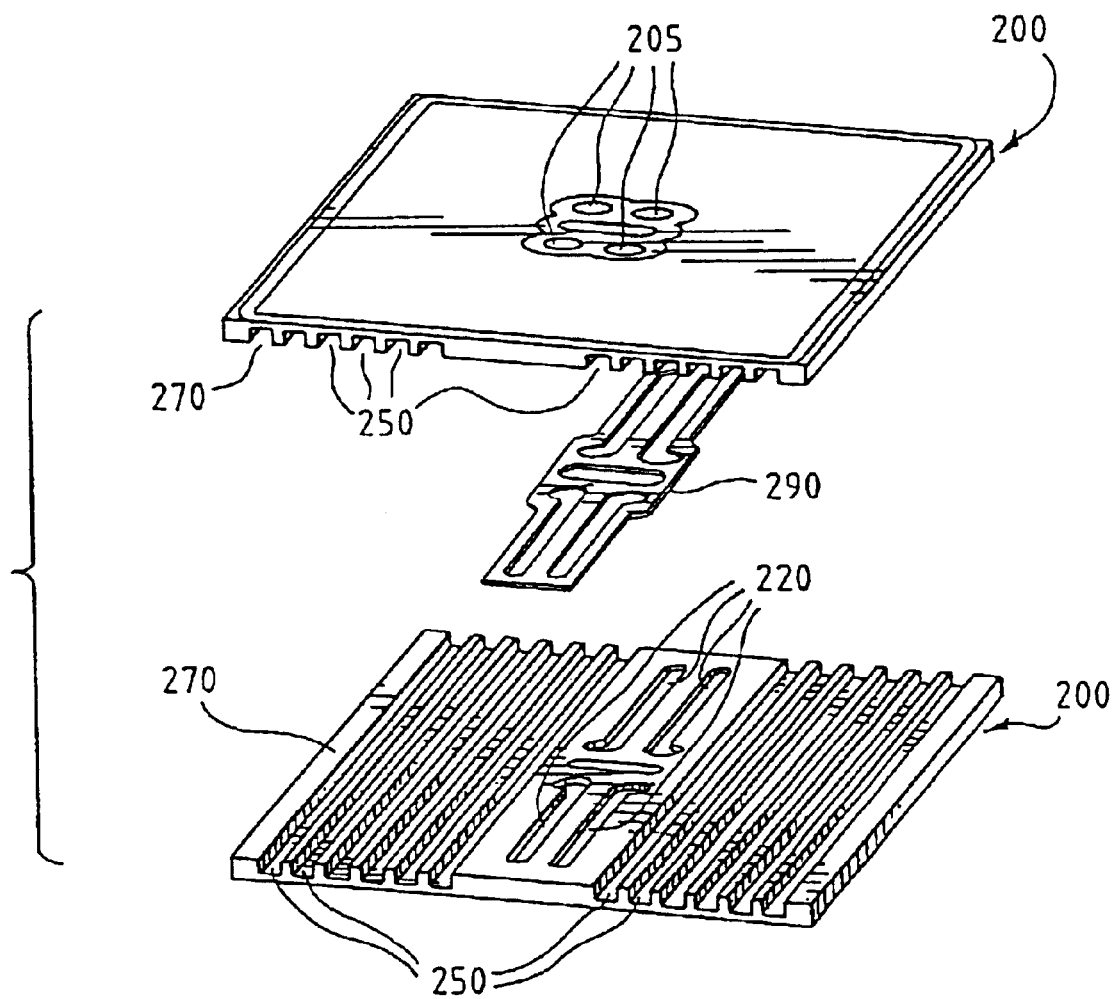
FIG. 4 is an exploded perspective view of an adjoining pair of separator plates with a gasket interposed between the non-active surfaces thereof.

FIG. 4 shows in an exploded view, how adjoining non-active surfaces 270 of two separator plates 200 can be assembled together. In the embodiment shown in FIG. 4, a gasket 290 is used to seal around manifold openings 205 and reactant supply/exhaust channels 220 to prevent leakage and intermixing of the fuel and oxidant stream and coolant which are in contact with the adjoining non-active surfaces 270 of both plates.

In another embodiment, an adhesive can be used to bond the non-active surfaces of adjoining separator plates 200 together, without a gasket. Thus supply/exhaust channels 220 and cooling channels 250 are fluidly sealed where the adhesive bonds the adjoining plates together. The adhesive can be applied only where sealing is desired. To improve electrical conductivity between adjoining plates, the adhesive can be electrically conductive. For example, the adhesive can be electrically conductive. For example, the adhesive compound can comprise electrically conductive particles.

While particular elements, embodiments and applications of the present invention have been shown and described, it will be understood, of course, that the invention is not limited thereto since modifications can be made by those skilled in the art without departing from the scope of the present disclosure, particularly in light of the foregoing teachings.

What is claimed is:

1. A method of operating a fuel cell having an anode and a cathode, the method comprising:

(a) directing a fuel stream to the anode;

(b) directing an oxidant stream to the cathode; and (c) connecting a load across the fuel cell;

wherein the fuel and oxidant streams are directed to the anode and cathode respectively through separator plates having an active side and a non-active side and wherein at least one of the fuel and oxidant streams traverse at least a portion of the non-active side of the respective separator plate.

2. The method of claim 1 wherein the separator plates are flow field plates.

3. The method of claim 1 wherein each of the fuel and oxidant streams traverses at least a portion of the non-active sides of the respective separator plates.

4. The method of claim 1 wherein the at least one of the fuel and oxidant streams traverses a portion of the non-active side of the respective separator plate before being directed to one of the anode and cathode.

5. The method of claim 4 wherein the at least one fuel or oxidant streams also traverses a portion of the non-active side of the respective separator plate after being directed to the anode or cathode.

6. The method of claim 1 wherein the fuel is hydrogen.

7. The method of claim 1 wherein the oxidant is air.

8. The method of claim 1 further comprising directing a coolant to the fuel cell.

9. The method of claim 8 wherein the coolant is directed across the non-active side of at least one of the anode or cathode separator plates.

10. The method of claim 8 wherein the directing a coolant step is performed by a pump or fan.

11. The method of claim 1 wherein the fuel cell is in a fuel cell stack.

\* \* \* \* \*